United States Patent [19]
Webb et al.

[11] Patent Number: 5,489,772
[45] Date of Patent: Feb. 6, 1996

[54] VARIABLE OPTICAL SAMPLING RATE DEPENDENT ON REQUESTED SCAN RESOLUTION

[75] Inventors: Steven L. Webb, Loveland; Greg A. Degi, Fort Collins, both of Colo.

[73] Assignee: Hewlett-Packard Company, Palo Alto, Calif.

[21] Appl. No.: 339,107

[22] Filed: Nov. 14, 1994

[51] Int. Cl.$^6$ .................................................. H01L 27/00
[52] U.S. Cl. ...................... 250/208.1; 250/234; 348/297; 358/482
[58] Field of Search ...................... 348/362, 294, 348/297; 358/482, 474, 483; 250/208.1, 234, 235, 236

[56] References Cited

U.S. PATENT DOCUMENTS

| | | | |
|---|---|---|---|
| 4,591,727 | 5/1986 | Gaebelein et al. | 250/578 |
| 5,032,712 | 7/1991 | Ito | 250/208.1 |
| 5,047,871 | 9/1991 | Meyer et al. | 358/486 |
| 5,265,039 | 11/1993 | Curbelo et al. | 364/574 |
| 5,336,878 | 8/1994 | Boyd et al. | |
| 5,373,372 | 12/1994 | Loewen | 358/486 |

OTHER PUBLICATIONS

United States Patent Application Ser. No. 08/174,868 filed Dec. 29, 1993 for Procedure for Reducing Time for Image Elements by Combining Charge of Adjacent Pixels into a New Composite Pixel of Greg A. Degi.

*Primary Examiner*—Edward P. Westin
*Assistant Examiner*—Stephen Calogero

[57] ABSTRACT

A method of determining an exposure time for a photosensor based on a desired resolution along a scan direction and a desired resolution in a cross direction may comprise the steps of determining an initial exposure time based on the desired resolution in the cross direction; determining a minimum resolution in the scan direction based on the initial exposure time; comparing the minimum resolution in the scan direction to the desired resolution in the scan direction; and increasing the initial exposure time if the minimum resolution in the scan direction is greater than the desired resolution in the scan direction.

20 Claims, 2 Drawing Sheets

VARIABLE OPTICAL SAMPLING RATE DEPENDENT ON REQUESTED SCAN RESOLUTION

BACKGROUND

The present invention relates to image scanner technology in general and more specifically to a method for varying the optical sampling rate of an image scanner.

Optical scanners generate data signals representative of an object or document by projecting an image of the object or document onto an optical photosensor array. The data signals may then be digitized and stored for later use. For example, the data signals may be used by a personal computer to produce an image of the scanned object or document on a suitable display device.

Most optical scanners use illumination and optical systems to illuminate the object and focus a small area of the illuminated object, usually referred to as a "scan line," onto the optical photosensor array. The entire object is then scanned by sweeping the illuminated scan line across the entire object, either by moving the object with respect to the illumination and optical assemblies or by moving the illumination and optical assemblies relative to the object.

A typical scanner optical system will include a lens assembly to focus the image of the illuminated scan line onto the surface of the optical photosensor array. Depending on the particular design, the scanner optical system may also include a plurality of mirrors to "fold" the path of the light beam, thus allowing the optical system to be conveniently mounted within a relatively small enclosure. In order to allow a smaller photosensor array to be used, most optical systems also reduce the size of the image of the scan line that is focused onto the surface of the photosensor. For example, many optical systems have a lens reduction ratio of about 8:1, which reduces the size of the image of the scan line by a factor of about 8.

While various types of photosensor devices may be used in optical scanners, a commonly used sensor is the charge coupled device or CCD. As is well-known, a CCD may comprise a large number of individual cells or "pixels," each of which collects or builds-up an electrical charge in response to exposure to light. Since the size of the accumulated electrical charge in any given cell or pixel is related to the intensity and duration of the light exposure, a CCD may be used to detect light and dark spots on an image focused thereon. In a typical scanner application, the charge built up in each of the CCD cells or pixels is measured and then discharged at regular intervals known as exposure times or sampling intervals, which may be about 5 milliseconds or so for a typical scanner. Since the charges (i.e., image data) are simultaneously collected in the CCD cells during the exposure time, the CCD also includes an analog shift register to convert the simultaneous or parallel data from the CCD cells into a sequential or serial data stream. A typical analog shift register comprises a plurality of "charge transfer buckets" each of which is connected to an individual cell. At the end of the exposure time, the charges collected by each of the CCD cells are simultaneously transferred to the charge transfer buckets, thus preparing the CCD cells for the next exposure sequence. The charge in each bucket is then transferred from bucket to bucket out of the shift register in a sequential or "bucket brigade" fashion during the time the CCD cells are being exposed to the next scan line. The sequentially arranged charges from the CCD cells may then be converted, one-by-one, into a digital signal by a suitable analog-to-digital converter.

In most optical scanner applications, each of the individual pixels in the CCD are arranged end-to-end, thus forming a linear array. Each pixel in the CCD array thus corresponds to a related pixel portion of the illuminated scan line. The individual pixels in the linear photosensor array are generally aligned in the "cross" direction, i.e., perpendicular to the direction of movement of the illuminated scan line across the object (also known as the "scan direction"). Each pixel of the linear photosensor array thus has a length measured in the cross direction and a width measured in the scan direction. In most CCD arrays the length and width of the pixels are equal, typically being about 8 microns or so in each dimension.

The resolution in the cross direction is a function of the number of individual cells in the CCD. For example, a commonly used CCD photosensor array contains a sufficient number of individual cells or pixels to allow a resolution in the cross direction of about 600 pixels, or dots, per inch (dpi), which is referred to herein as the "native resolution in the cross direction."

The resolution in the scan direction is inversely related to the product of the scan line sweep rate and the CCD exposure time (i.e., the sampling interval). Therefore, the resolution in the scan direction may be increased by decreasing the scan line sweep rate, the CCD exposure time, or both. Conversely, the resolution in the scan direction may be decreased by increasing the scan line sweep rate, the CCD exposure time, or both. The "minimum resolution in the scan direction" for a given exposure time is that resolution achieved when scanning at the maximum scan line sweep rate at that exposure time. For example, a maximum scan line sweep rate of about 3.33 inches per second and a maximum exposure time of about 5 milliseconds will result in a minimum resolution in the scan direction of about 60 dpi.

The resolution in the cross direction may be decreased below the native resolution in the cross direction by using any one of a number of pixel dropping algorithms to ignore, or drop, data from certain cells in the CCD. For example, the resolution in the cross direction in a CCD having a native resolution of 600 dpi may be decreased to 300 dpi by ignoring or dropping data from every other pixel. Most commonly used pixel dropping techniques ignore or drop the pixel data after it has been converted into a digital signal by the analog-to-digital converter. It is also possible to increase the resolution in the cross direction over the native resolution in the cross direction by using various data interpolation techniques to increase the effective resolution in the cross direction. For example, some data interpolation techniques can be used to increase the effective resolution in the cross direction to 1200 dpi or more with a CCD having a native resolution in the cross direction of only 600 dpi.

As mentioned above, the resolution in the scan direction is a function of the scan line sweep rate as well as the CCD exposure time. Therefore, the resolution in the scan direction can be varied by changing the scan line sweep rate, the CCD exposure time, or both. It should be noted that resolution in the scan direction corresponding to a given maximum scan line sweep rate and CCD exposure time is fixed and represents the minimum resolution in the scan direction for that exposure time. However, the resolution in the scan direction may be further reduced by ignoring or dropping whole lines of data. Such line dropping techniques are analogous to the pixel dropping techniques described above.

One problem associated with scanners that drop pixels to decrease the resolution in the cross direction, or drop lines to decrease the resolution in the scan direction, or both, is that the pixel and line dropping processes tend to introduce various artifacts and distortions into the image data, such as alising and moire patterns.

Another problem associated with pixel and line dropping processes is that the pixel and line dropping functions are usually performed after the charge data from the individual CCD cells have been converted into digital form. Consequently, the maximum sampling rate, thus scanning speed, is limited to the data conversion rate of the analog to digital (A/D) converter. Since most scanners operate at the maximum effective sampling rate of the A/D converter, the scanning rate when scanning at reduced resolution is essentially the same as when scanning at maximum resolution. Put in other words, selecting a decreased resolution will not usually result in an increased scan rate.

Even if faster analog to digital converters are used, there is a limit to the maximum scan rate that can be achieved. For example, the provision of a faster analog-to-digital converter will allow faster scan rates at a given resolution only if the exposure time (i.e., sampling interval) is decreased. However, since the amount of charge produced by a given CCD cell is proportional to the exposure time, shorter exposure times will result in proportionally lower signal levels. Assuming constant system noise, such lower signal levels will yield a lower signal to noise ratio, which noise usually appears in the image data as "snow."

Therefore, there remains a need for an image scanner that can scan at a wide range of resolutions but without the image degradation problems, such as alising, and the generation of moire patterns, that are typically associated with the line dropping processes typically used in currently available scanners. Ideally, the selection of a decreased scanning resolution should also result in a corresponding increase in scanning speed, but without the need to resort to expensive, high-speed analog-to-digital converters and without reducing the signal-to-noise ratio of the resulting image data signal.

SUMMARY OF THE INVENTION

A method of determining an exposure time for a photosensor based on a desired resolution along a scan direction and a desired resolution in a cross direction may comprise the steps of determining an initial exposure time based on the desired resolution in the cross direction; determining a minimum resolution in the scan direction based on the initial exposure time; comparing the minimum resolution in the scan direction to the desired resolution in the scan direction; and increasing the initial exposure time if the minimum resolution in the scan direction is greater than the desired resolution in the scan direction.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
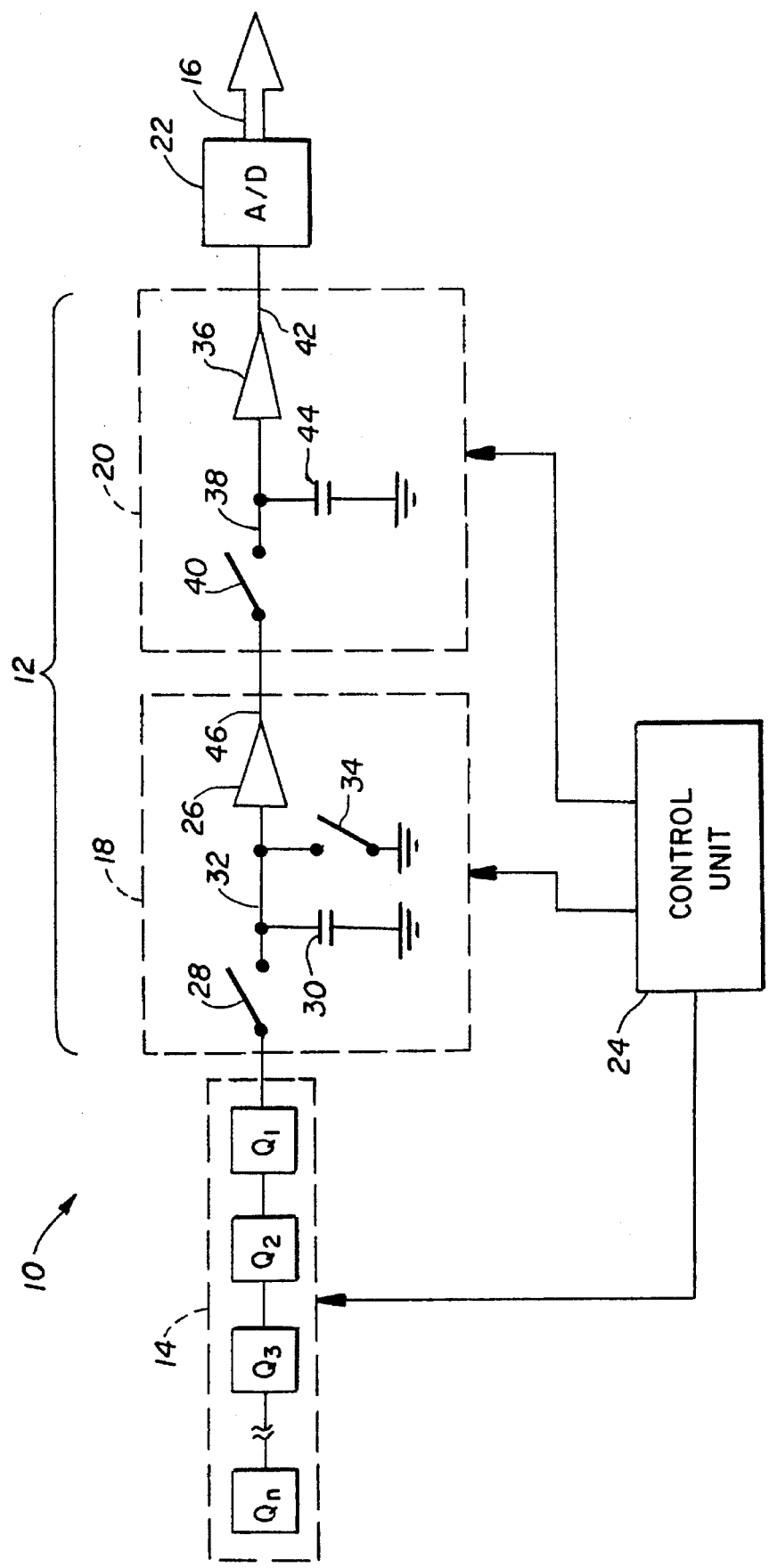
FIG. 1 is a schematic diagram of a data sampling and conversion circuit for selectively combining and digitizing pixel charges from a CCD.

The data sampling and conversion circuit 10 of an optical scanner (not shown) having the variable optical sampling rate dependent on requested scan resolution according to the present invention is best seen in FIG. 1. Essentially, the data sampling and conversion circuit 10 comprises a conversion circuit 12 for converting pixel charges stored in a photosensor, such as a charge-coupled-device (CCD) 14 into a digital data stream 16. As is well-known, CCD 14 includes n charge transfer buckets $Q_1$, $Q_2$, $Q_3$, through $Q_n$, which sequentially transfer the charges that were simultaneously collected from each of the individual pixels in the CCD. A charge-to-voltage converter 18 connected to the last charge transfer bucket $Q_1$ of CCD 14 converts the charge stored in the last bucket $Q_1$ into a voltage, which voltage is then converted into a digital signal by an analog to digital (A/D) converter 22. When scanning at certain resolutions, the converter 18 converts into a voltage only the charge from one of the buckets Q, which, of course, corresponds to the charge from a single pixel. However, when scanning at other resolutions, the voltage converter circuit 18 collects the charge from two or more buckets Q before converting the total charge into a voltage. A hold circuit 20 may be connected to the voltage converter circuit 18 to act as a buffer in the event data are shifted out of the last bucket $Q_1$ faster than they can be converted into digital signals by the A/D converter 22. A control unit 24 connected to the CCD array 14, charge-to-voltage converter 18, hold circuit 20, and A/D converter 22 controls the timing and operation of each circuit. While any circuit may be used that accomplishes the functions of the data sampling and conversion circuit 10 shown and described herein, the data sampling and conversion circuit may be of the type disclosed in U.S. patent application Ser. No. 08/174,868 of Degi and filed on Dec. 29, 1993, which is incorporated herein by reference for all that it discloses.

When scanning at the "native" resolution in the cross direction and at the minimum resolution in the scan direction, the control unit 24 operates the CCD at a predetermined maximum exposure time (i.e., sampling interval) and sweeps the scan line over the object at a predetermined maximum scan sweep rate. When operating at the maximum exposure time and scan line sweep rate, a single scan line comprises data from each and every pixel of the CCD 14, and the resolution in the scan direction corresponds to the minimum resolution in the scan direction. When operating at other resolutions, however, the control unit 24 determines the optimum exposure time and the number of CCD cells for which charge data should be combined in order to maximize the scan line sweep rate, but without substantially reducing the signal to noise ratio and without having to resort to line dropping techniques.

A significant advantage of the present invention is that it allows scanning over a wide range of resolutions, but without the need to resort to line dropping processes, which can create alising or moire patterns in the image data. Moreover, since the data sampling and conversion circuit 10 may combine the signals from several CCD pixels before they are digitized, scanning at certain resolutions may allow a proportionate decrease in the number of analog to digital conversions that need to be performed by the A/D converter 22. This excess conversion capacity allows the CCD exposure time (i.e., sampling interval) to be reduced, which may be followed by a corresponding increase in scan sweep speed at a given resolution. Unlike prior scanners, the decreased exposure times made possible by the present invention may result in only a slight reduction the signal to noise ratio of the CCD, since the signals from several pixels are combined when scanning at such decreased exposure times.

The details of the data sampling and conversion circuit 10 are best understood by referring again to FIG. 1. As was described briefly above, the data sampling and conversion circuit 10 includes a conversion circuit 12 connected to the last charge transfer bucket $Q_1$ of CCD array 14. Conversion circuit 12 includes charge-to-voltage converter circuit 18 and hold circuit 20 which together convert the charges from one or more of the charge transfer buckets Q, thus individual cells in the CCD array 14, into an analog voltage which is then converted into a digital signal by analog to digital converter 22. The charge-to-voltage converter circuit 18 comprises a capacitor 30 for collecting charge from the last charge transfer bucket $Q_1$ and an isolation amplifier 26 to isolate capacitor 30 and prevent it from being loaded by the hold circuit 20. More specifically, the input line 32 of isolation amplifier 26 is connected to the last bucket $Q_1$ via switch 28. The capacitor 30 is connected between the input line 32 and a suitable ground. A second switch 34 is also connected to input line 32 and a suitable ground and, when closed, discharges capacitor 30, preparing it to receive the next charge from charge transfer bucket $Q_1$.

The hold circuit 20 is similar to the converter circuit 18 and comprises a capacitor 44 for storing the output voltage from isolation amplifier 26. Hold circuit 20 includes its own isolation amplifier 36 to isolate capacitor 44 and prevent it from being loaded by analog-to-digital (A/D) converter 22. More specifically, the input line 38 of isolation amplifier 36 is connected to the output 46 of amplifier 26 via a third switch 40. The capacitor 44 is connected between the input line 38 and a suitable ground. The output line 42 of amplifier 36 is connected to the analog to digital converter 22.

A control unit 24 connected to the CCD 14, converter circuit 18, hold circuit 20, and A/D converter 22 controls the operation of the respective components. Initially, switches 28 and 40 are open and switch 34 is closed, which eliminates any charge on capacitor 30. Next, the control unit 24 closes switch 28 and opens switch 34, and then shifts the pixel charges stored in buckets $Q_1$–$Q_n$ one bucket to the right. This places the charge that was in bucket $Q_1$ onto capacitor 30. The resulting voltage V on capacitor 30 is equal to the amount of charge Q from bucket $Q_1$ divided by the capacitance C of capacitor 30. That is, $V=Q/C$.

Once the capacitor 30 is charged, control unit 24 closes switch 40. The output voltage from isolation amplifier 26 is then duplicated on capacitor 44. Once capacitor 44 is charged, the control unit 24 opens switch 40, thus allowing the converter circuit to accept another charge. In the meantime, the output voltage of amplifier 36 is converted into a digital signal by the A/D converter 22. The digitized data from the A/D converter 22 may then be processed as desired, ultimately resulting in a digital representation of the source image.

Note that the processing of the charge in the next bucket can begin while the charge from the previous bucket is being converted into a digital signal. However, the conversion process must be completed before switch 40 is again closed. Of course, the hold circuit 20 would not be required if the A/D converter 22 is fast enough to digitize the voltage signals before the charge from the next bucket is shifted into capacitor 30.

When scanning at certain reduced resolutions, the control unit 24 controls voltage converter circuit 18 in such a way that it combines the charges from two or more pixel buckets before sending the signal to hold circuit 20. As an example, the charge from the first pixel is clocked into capacitor 30 in the manner already described. Then, before closing switch 40, and without closing switch 34 to discharge capacitor 30, the control unit 24 clocks into capacitor 30 the charge from the second pixel. When the desired number of pixels have been combined (i.e., two or more), the output voltage across capacitor 30 is duplicated in the hold circuit 20, which voltage is then digitized by A/D converter 22.

While the data sampling and conversion circuit 10 may be operated in the manner described above to accomplish scanning at reduced resolutions in the cross direction, increased scan sweep rates at such reduced resolutions can only be accomplished by decreasing the exposure time (i.e., sampling interval) of the CCD 14. However, if the reduced exposure time is not properly selected, the resolution in the scan direction may not correspond to the desired resolution in the scan direction, thus making it necessary to drop lines to achieve the desired resolution. To illustrate the problem, consider a scanner having a native resolution in the cross direction of 600 dpi and a minimum resolution in the scan direction of 60 dpi. Suppose the operator desires to scan at 300 dpi in the cross direction and 100 dpi in the scan direction. If so, the control unit 24 would operate the data sampling and conversion circuit 10 so that the charges from two pixel elements would be combined together by the converter circuit 18. As explained above, combining the charges from two pixels in a CCD having a native cross resolution of 600 dpi yields an effective resolution in the cross direction of 300 dpi. In order to increase the scanning speed, the control unit would also shorten the exposure time of the CCD array to one half of the maximum exposure time, i.e., the exposure time corresponding to the native resolution in the cross direction. Of course, so shortening the exposure time has the effect of doubling the minimum resolution in the scan direction from 60 dpi to 120 dpi. However, since the user selected a resolution in the scan direction of only 100 dpi, the image processing circuit (not shown) would then have to resort to line dropping processes to decrease the resolution in the scan direction from 120 dpi to 100 dpi. As mentioned above, such line dropping processes are undesirable since they can result in aliasing and moire patterns.

Figure 2:
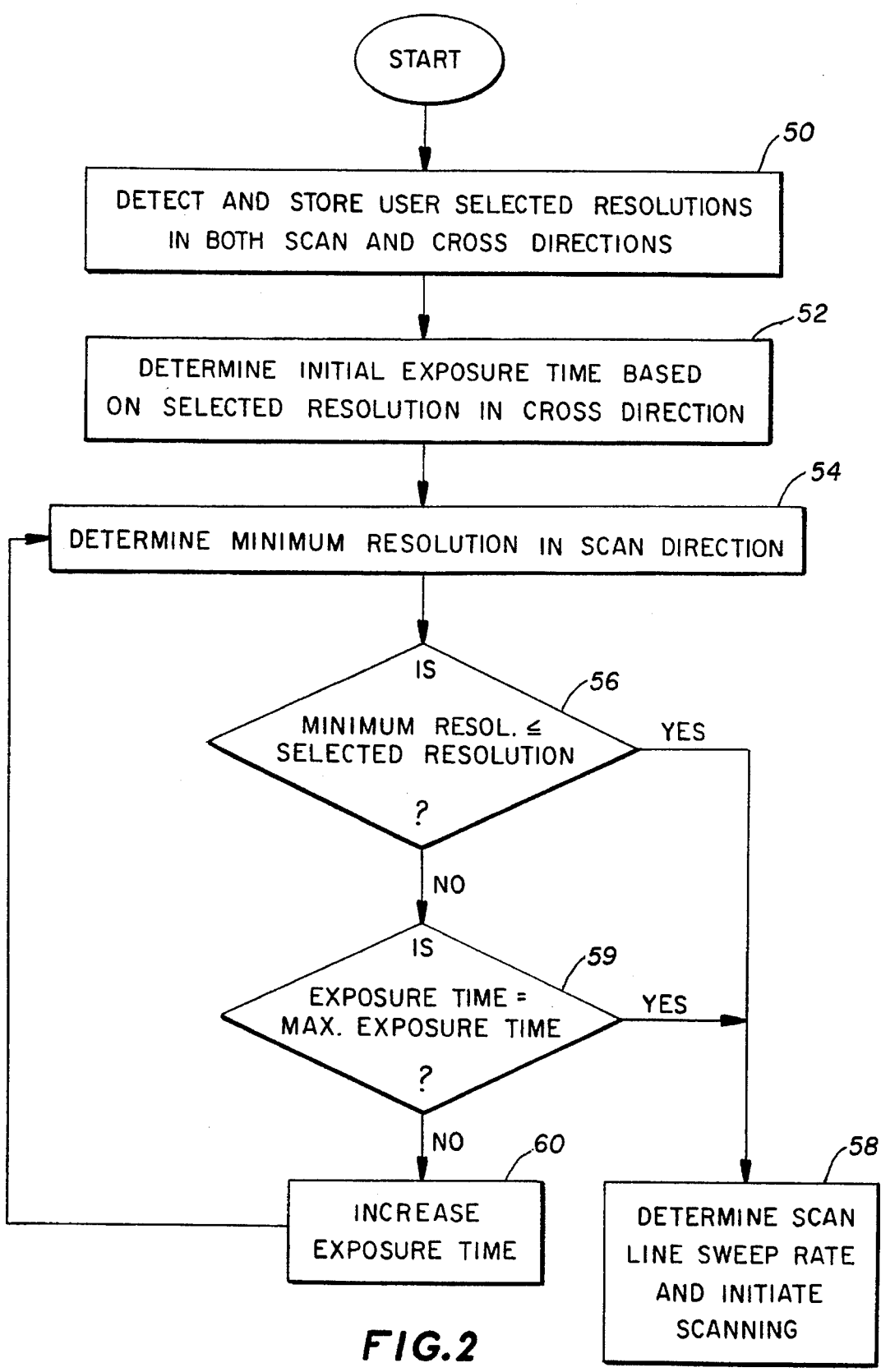
FIG. 2 is a flow chart of the steps performed by the control unit shown in FIG. 1 to determine an appropriate CCD exposure time (i.e., sampling rate).

The present invention avoids the need to resort to line dropping processes in cases analogous to the above example by directing the control unit 24 to operate according to the process illustrated in FIG. 2. In the first step 50, the control unit 24 detects and stores in a suitable memory system (not shown) the desired (i.e, user selected) resolutions in both the cross direction and the scan direction. In process 52, the control unit 24 determines an initial exposure time based on the selected resolution in the cross direction. For example, if the selected resolution in the cross direction is between ½ and twice the native resolution in the cross direction, the control unit 24 will set the initial exposure time to be equal to the native or maximum exposure time, i.e., that exposure time corresponding to the native resolution in the cross direction. If the selected resolution in the cross direction is between ⅓ and ½ of the native resolution in the cross direction, the control unit will set the initial exposure time to be ½ the maximum exposure time. If the selected resolution is less than ⅓ of the native resolution, the control unit 24 will set the initial exposure time to be ⅓ the maximum exposure time.

Having thus determined an initial exposure time, the control unit then performs step 54 to determine the corresponding or minimum resolution in the scan direction. As used herein, the term "minimum resolution in the scan direction" refers to that resolution in the scan direction resulting from a given scan line sweep rate and CCD exposure time. The term "minimum" is used since that resolution is the minimum resolution in the scan direction that can be achieved without resorting to line dropping processes. The control unit 24 next performs step 56 to determine whether the minimum resolution in the scan direction is less than or equal to the resolution that was selected by the user. If so, then the control unit 24 then proceeds to step 58 to determine the scan line sweep rate and initiate scanning. The scan line sweep rate is determined by dividing 1 by the product of the desired resolution in the scan direction and the exposure time. If the minimum resolution in the scan direction is greater than the selected resolution, then the control unit performs step 59 to determine whether the exposure time is equal to the maximum exposure time. If it is, the exposure time cannot be further increased and the control unit 24 proceeds to step 58. If, however, the exposure time is still less than the maximum exposure time, the control unit 24 will perform step 60 to increase the exposure time by one step, then repeat steps 54 and 56.

In the embodiment shown and described above, the exposure time may be one of three times, the exposure time corresponding to the native resolution in the cross direction, i.e., the maximum exposure time, ½ the maximum exposure time, and ⅓ the maximum exposure time. Thus, if the initial exposure time was determined in step 54 to be ⅓ the maximum exposure time, and that initial exposure time did not result in a minimum resolution in the scan direction that was less than the user selected resolution, then step 60 will result in the control unit selecting the next highest exposure time, i.e., ½ the maximum exposure time. The control unit 24 then performs step 54 to determine the minimum resolution in the scan direction by dividing 1 by the product of the maximum scan line sweep rate and the new exposure time. If the minimum resolution is then less than the user selected resolution, the control unit will proceed with the scanning operation at the new exposure time. If the minimum resolution is still greater than the user selected resolution, the control unit 24 again executes steps 59 and 60 to increase the exposure time by one step, and repeats steps 54 and 56.

By way of example, the process shown in FIG. 2 and described above yields the exposure times corresponding the resolutions shown in Table 1. The resolutions shown in Table 1 are based on a scanner having minimum resolution in the scan direction of 60 dpi and a native resolution in the cross direction of 600 dpi. The scanner is also capable of scanning at resolutions corresponding to ½ and ⅓ the native resolution of 600 dpi, i.e., 300 dpi and 200 dpi.

TABLE 1

| Requested Scan Resolution | Requested Cross Resolution | | |
|---|---|---|---|
| | 1200–301 | 300–201 | 200–12 |
| 1200–180 | 600 dpi | 300 dpi | 200 dpi |
| 179–121 | 600 dpi | 300 dpi | 300 dpi |
| 120–12 | 600 dpi | 600 dpi | 600 dpi |

For example, suppose a user desires to scan at a resolution in the scan direction of 150 dpi and in the cross direction of 250 dpi. The control unit 24 will then operate the CCD at an effective resolution in the cross direction of 300 dpi. That is, the conversion circuit 12 (FIG. 1) will combine the charge data from every other CCD pixel and the control unit 24 will set the exposure time to ½ the maximum exposure time. This will result in a resolution in the cross direction of 300 dpi and a minimum resolution in the scan direction of 120 dpi. The image data processing circuit (not shown) will then drop pixels as necessary to achieve the desired resolution in the cross direction of 250 dpi. However, since the minimum resolution in the scan direction is now 120 dpi, there is no need to drop lines, and the desired resolution of 150 dpi in the scan direction can be achieved by determining a new scan line sweep rate, which is equal to 1/(the desired resolution in the scan direction times the CCD exposure time).

It should kept in mind that while the embodiment shown and described herein is capable of selecting between CCD exposure times corresponding to one of three (3) discrete resolutions, i.e., 600 dpi, 300 dpi, and 200 dpi, other embodiments are possible that would select between three or more exposure times, as would be obvious to persons having ordinary skill in the art. For example, the data sampling and conversion circuit 10 could be easily adapted to select between four (4) exposures times corresponding to one of four (4) discrete resolutions. Therefore, the present invention should not be regarded as limited to exposure times corresponding to only three discrete resolutions.

It is contemplated that the inventive concepts herein described may be variously otherwise embodied and it is intended that the appended claims be construed to include alternative embodiments of the invention except insofar as limited by the prior art.

What is claimed is:

1. A method of determining an exposure time for a photosensor based on a desired resolution along a scan direction and a desired resolution in a cross direction, comprising the steps of:

determining an initial exposure time based on the desired resolution in the cross direction;

determining a minimum resolution in the scan direction based on said initial exposure time;

comparing said minimum resolution in the scan direction to the desired resolution in the scan direction; and increasing said initial exposure time to an increased exposure time and redetermining a minimum resolution in the scan direction based on said increased exposure time and recomparing said minimum resolution in the scan direction to the desired resolution in the scan direction until either: a) said minimum resolution in the scan direction is not greater than the desired resolution in the scan direction or b) said increased exposure time is equal to a predetermined maximum exposure time.

2. The method of claim 1, wherein the step of determining a minimum resolution in the scan direction based on said initial exposure time includes the step of multiplying said initial exposure time by a predetermined maximum scan line sweep rate.

3. The method of claim 2, wherein the step of determining an initial exposure time based on the desired resolution in the cross direction includes the steps of:

comparing the desired resolution in the cross direction with a predetermined native resolution in the cross direction;

setting the initial exposure time to be equal to the predetermined maximum exposure time if the desired resolution in the cross direction is not less than the predetermined native resolution in the cross direction; and setting the initial exposure time below the predetermined maximum exposure time if the desired resolution in the cross direction is less than the predetermined native resolution in the cross direction.

4. The method of claim 3, wherein said initial exposure time can be selected to be the predetermined maximum exposure time divided by an integer.

5. The method of claim 4, wherein the step of setting the initial exposure time below the predetermined maximum exposure time comprises the steps of:

setting the initial exposure time to be equal to ½ the predetermined maximum exposure time if the desired resolution in the cross direction is between ⅓ and ½ the predetermined native resolution in the cross direction; and setting the initial exposure time to be equal to ⅓ the predetermined maximum exposure time if the desired resolution in the cross direction is less than ⅓ the predetermined native resolution in the cross direction.

6. The method of claim 5, wherein the predetermined maximum exposure time corresponds to a native resolution in the cross direction of 600 dpi.

7. The method of claim 6, wherein the desired resolution in the cross direction and the desired resolution in the scan direction may be selected between resolutions of 12 dpi through 1200 dpi.

8. The method of claim 7, wherein the exposure time is equal to the maximum exposure time for any desired resolution in the scan direction and for desired resolutions in the cross direction between 301 dpi and 1200 dpi, inclusive, and for any desired cross resolution when the desired resolution in the scan direction is between 12 and 120 dpi, inclusive.

9. The method of claim 8, wherein the exposure time is equal to the maximum exposure time divided by 2 for desired resolutions in the cross direction between 201 and 300 dpi, inclusive, and for desired resolutions in the scan direction between 121 and 1200 dpi, inclusive, and for desired resolutions in the cross direction between 12 and 200 dpi, inclusive, and for desired resolutions in the scan direction between 179 and 121 dpi, inclusive.

10. The method of claim 9, wherein the exposure time is equal to the maximum exposure time divided by 3 for desired resolutions in the cross direction between 12 and 200 dpi, inclusive, and for desired resolutions in the scan direction between 180 and 1200 dpi, inclusive.

11. A method of scanning an object at a desired resolution along a scan direction and a desired resolution in a cross direction, comprising the steps of:

determining an initial exposure time for a scanner photosensor based on the desired resolution in the cross direction;

determining a minimum resolution in the scan direction based on said initial exposure time;

comparing said minimum resolution in the scan direction to the desired resolution in the scan direction;

increasing said initial exposure time to an increased exposure time, redetermining a minimum resolution in the scan direction based on said increased exposure time and recomparing said minimum resolution in the scan direction to the desired resolution in the scan direction until either: a) said minimum resolution in the scan direction is not greater than the desired resolution in the scan direction or b) said increased exposure time is equal to a predetermined maximum exposure time;

determining an effective resolution in the cross direction based on said increased exposure time;

determining a scan line sweep rate based on said increased exposure time and the desired resolution in the scan direction; and scanning the object at said increased exposure time and at said scan line sweep rate.

12. The method of claim 11, wherein the step of determining a minimum resolution in the scan direction based on said initial exposure time includes the step of multiplying said initial exposure time by a predetermined maximum scan line sweep rate.

13. The method of claim 12, wherein the step of determining an initial exposure time based on the desired resolution in the cross direction includes the steps of:

comparing the desired resolution in the cross direction with a predetermined native resolution in the cross direction;

setting the initial exposure time to be equal to the predetermined maximum exposure time if the desired resolution in the cross direction is not less than the predetermined native resolution in the cross direction; and setting the initial exposure time below the predetermined maximum exposure time if the desired resolution in the cross direction is less than the predetermined native resolution in the cross direction.

14. The method of claim 13, wherein said initial exposure time can be selected to be the predetermined maximum exposure time divided by an integer.

15. The method of claim 14, wherein the step of setting the initial exposure time below the predetermined maximum exposure time comprises the steps of:

setting the initial exposure time to be equal to ½ the predetermined maximum exposure time if the desired resolution in the cross direction is between ⅓ and ½ the predetermined native resolution in the cross direction; and setting the initial exposure time to be equal to ⅓ the predetermined maximum exposure time if the desired resolution in the cross direction is less than ⅓ the predetermined native resolution in the cross direction.

16. The method of claim 15, wherein the predetermined maximum exposure time corresponds to a native resolution in the cross direction of 600 dpi.

17. The method of claim 16, wherein the desired resolution in the cross direction and the desired resolution in the scan direction may be selected between resolutions of 12 dpi through 1200 dpi.

18. The method of claim 17, wherein the exposure time is equal to the maximum exposure time for any desired resolution in the scan direction and for desired resolutions in the cross direction between 301 dpi and 1200 dpi, inclusive, and for any desired cross resolution when the desired resolution in the scan direction is between 12 and 120 dpi, inclusive.

19. The method of claim 18, wherein the exposure time is equal to the maximum exposure time divided by 2 for desired resolutions in the cross direction between 201 and 300 dpi, inclusive, and for desired resolutions in the scan direction between 121 and 1200 dpi, inclusive, and for desired resolutions in the cross direction between 12 and 200 dpi, inclusive, and for desired resolutions in the scan direction between 179 and 121 dpi, inclusive.

20. The method of claim 19, wherein the exposure time is equal to the maximum exposure time divided by 3 for desired resolutions in the cross direction between 12 and 200 dpi, inclusive, and for desired resolutions in the scan direction between 180 and 1200 dpi, inclusive.

* * * * *